(12) United States Patent
Peterson

(10) Patent No.: US 10,710,653 B2
(45) Date of Patent: Jul. 14, 2020

(54) SELF ALIGNING IDLER WHEEL DESIGN FOR RUBBER TRACKS

(71) Applicant: ContiTech Transportbandsysteme GmbH, Hannover (DE)

(72) Inventor: Paul Peterson, Cuyahoga Falls, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 129 days.

(21) Appl. No.: 15/745,442

(22) PCT Filed: Aug. 15, 2016

(86) PCT No.: PCT/US2016/046962
§ 371 (c)(1),
(2) Date: Jan. 17, 2018

(87) PCT Pub. No.: WO2017/058371
PCT Pub. Date: Apr. 6, 2017

(65) Prior Publication Data
US 2018/0208257 A1 Jul. 26, 2018

Related U.S. Application Data

(60) Provisional application No. 62/234,284, filed on Sep. 29, 2015.

(51) Int. Cl.
*B62D 55/14* (2006.01)
*B62D 55/125* (2006.01)
*B62D 55/24* (2006.01)

(52) U.S. Cl.
CPC ........... *B62D 55/14* (2013.01); *B62D 55/125* (2013.01); *B62D 55/244* (2013.01)

(58) Field of Classification Search
CPC ..... B62D 55/14; B62D 55/244; B62D 55/125
(Continued)

(56) References Cited

U.S. PATENT DOCUMENTS 2,809,071 A 10/1957 Kordes
2,837,378 A * 6/1958 Carroll ................... B62D 55/30
305/149
(Continued)

FOREIGN PATENT DOCUMENTS

JP 2001146182 A 5/2001

OTHER PUBLICATIONS

Supplementary European Search Report dated May 17, 2019 of European Phase of International Application PCT/US2016/046962 on which this application is based.

*Primary Examiner* — S. Joseph Morano
*Assistant Examiner* — Jean W Charleston
(74) *Attorney, Agent, or Firm* — Gregory Adams; David L. Cate

(57) ABSTRACT

A vehicle track assembly includes an endless track having a first surface displaying a series of ground engaging profiles longitudinally spaced along the first surface and a second surface displaying a series of wheel engaging drive lugs spaced longitudinally along the second surface, a drive wheel for engaging the drive lugs and at least one idler wheel defining an inside diameter and an outside diameter, where the inside diameter of the at least one first idler wheel is greater than the outside diameter of the first idler wheel per meter of idler wheel width. The at least one idler wheel is a plurality of idler wheels, which may include a first idler wheel and a second idler wheel. The first and second idler wheels may be parallel one another, and may be separated by a distance of greater than the width of the drive lugs.

23 Claims, 4 Drawing Sheets

(58) Field of Classification Search
USPC .......................................................... 305/165
See application file for complete search history.

(56) References Cited

U.S. PATENT DOCUMENTS

| | | | |
|---|---|---|---|
| 3,133,449 A * | 5/1964 | Van Antwerp et al. ..................... | G11B 19/265 |
| | | | 476/72 |
| 6,536,854 B2 * | 3/2003 | Juncker .................. | B62D 55/04 |
| | | | 305/115 |
| 6,869,153 B2 | 3/2005 | Wright et al. | |
| 7,997,666 B2 | 8/2011 | Bordini | |
| 2012/0153714 A1 | 6/2012 | Yelistratov | |
| 2013/0026819 A1 * | 1/2013 | Reshad .................. | B62D 55/12 |
| | | | 305/135 |
| 2015/0197294 A1 | 7/2015 | Hakes | |
| 2015/0259016 A1 | 9/2015 | Reshad | |

* cited by examiner

SELF ALIGNING IDLER WHEEL DESIGN FOR RUBBER TRACKS

RELATED APPLICATION INFORMATION

This Patent Application claims priority to U.S. Provisional Patent Application No. 62/234,284 filed Sep. 29, 2015, which is incorporated herein in its entirety, by reference.

FIELD

The field to which the disclosure generally relates is idler wheels, and more particularly to improved idler wheels useful for maintaining alignment with endless tracks.

BACKGROUND

This section provides background information to facilitate a better understanding of the various aspects of the disclosure. It should be understood that the statements in this section of this document are to be read in this light, and not as admissions of prior art.

Vehicles, such as snowmobiles, construction vehicles, military vehicles, and agricultural vehicles, are often equipped with endless elastomeric tracks fitted over a plurality of wheels to facilitate vehicle movement. In some of these applications a vehicle drive wheel powers the vehicle track, and vehicle idler wheels function as a pulley wheel because they are not powered. In some cases the idler wheels can also be weight-bearing. Idler wheels can carry a vehicle track from the ground and up towards the drive wheel, or from the drive wheel and down towards the ground level depending on whether the idler wheels are located in the front or back ends of the vehicle.

Typically the vehicle tracks have an internal centrally positioned row of drive lugs which engage drive bars on the vehicle's drive wheel. The drive lugs, also known as guide-drive lugs, function to transmit power from the drive wheel to the track, and they also assist in retaining the track on the vehicle. Exposure to uneven terrain, environmental elements such as rain and harsh temperatures, and abrasive objects can wear on the vehicle track and in the aggregate such exposures can cause a vehicle track to misalign and erode at an undesirable rate. The edges of a misaligned track tend to rub against surrounding machinery and can unravel from the persistent friction. Such track damage can also lead to damage to the tracked vehicle.

Numerous examples of vehicle track systems are described in the prior art. U.S. Pat. No. 7,997,666 reveals a crawler traction device for a crawler vehicle, in particular a tractor, the device having a carriage, a drive sprocket rotating about a first axis, an idler wheel rotating about a second axis parallel to the first axis. The track is looped about the drive sprocket and the idler wheel and meshes with the drive sprocket along a meshing arc. The traction device has a noise and vibration damping device having an auxiliary roller which rotates about a third axis parallel to the first axis and is eccentric with respect to the drive sprocket as well as smaller in diameter than the drive sprocket. One embodiment of the vehicle track used in this system includes using tapered lateral surfaces of chain links on the vehicle track in an effort to align the vehicle track.

U.S. Pat. No. 7,552,979 discloses a track system for a ground engaging vehicle such as a tractor is provided. Track systems shown include the ability to maintain existing gear ratios and vehicle speed when interchanging wheels with track systems as described above. Embodiments shown also exhibit improved support of the track system in relation to a vehicle axle that reduces stress problems associated with the axle or related components. Another feature includes pivoting the track system in a way that prevents the track system from rotating 360° around the axle when large obstacles are encountered. One embodiment of this invention includes drive lugs with slots to provide some track alignment.

U.S. Pat. No. 9,033,431 shows a track assembly for traction of a tracked vehicle, such as an agricultural vehicle, an industrial vehicle (e.g., a construction vehicle) or a military vehicle. The track assembly comprises a plurality of wheels which comprises a drive wheel and a plurality of roller wheels, as well as an elastomeric endless track disposed around the plurality of wheels for engaging the ground. A roller wheel may comprise a wheel body and a covering on the wheel body. The covering may comprise a lateral portion dimensioned to contact a drive/guide lug of the track. The roller wheels and the track may implement a self-alignment system of the track assembly. When the roller wheels roll on the bottom run of the elastomeric endless track, the roller wheels exert opposite lateral force components on the elastomeric endless track in a widthwise direction of the elastomeric endless track which tend to align the elastomeric endless track within the track assembly.

U.S. Pat. No. 6,869,153 discloses a track assembly for moving a vehicle which includes a track having lugs including both drive and guide portions on its inner surface. The guide portions substantially abut against the track rollers of the assembly. Such abutment maintains alignment of the track between those rollers so as to prevent it from moving from side to side and interfering with feeding of the drive portions onto the assembly drive sprocket. Further, the guide portions grab against the drive sprocket to maintain contact of the drive portions therewith. Each of the above functions permits uninterrupted movement of the vehicle since the track is enabled to move in a continued path.

Attempts to prevent track misalignment by modifying drive lugs of the vehicle track using links, slots, and tapered surfaces are described in the prior art. The prior art also relies upon force components and contact between the vehicle track and the drive lugs for alignment. However, the combined teachings of the prior art do not adequately resolve track alignment problems, and for this reason there is a need for adapted idler wheels which function to align the vehicle track.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some embodiments according to the disclosure resolve the deficiencies of the prior art by providing idler wheels which have been adapted to self-align the track of a tracked vehicle. Tracked vehicles which could benefit from such embodiments include snowmobiles, construction vehicles, military vehicles, agricultural vehicles, or any other tracked vehicles which utilize idler wheels.

In some embodiments of the disclosure, a vehicle track assembly is provided which includes an endless track having a first surface displaying a series of ground engaging profiles longitudinally spaced along the first surface and a second surface displaying a series of wheel engaging drive lugs spaced longitudinally along the second surface, a drive wheel for engaging the drive lugs and at least one idler wheel defining an inside diameter and an outside diameter, where the inside diameter of the at least one first idler wheel is greater than the outside diameter of the first idler wheel per meter of idler wheel width.

In some aspects, the at least one idler wheel is a plurality of idler wheels, which may, in some cases, include a first idler wheel and a second idler wheel. The first idler wheel may be essentially parallel to a second idler wheel, and the first idler wheel and the second idler wheel may be separated by a distance of greater than the width of the drive lugs. The inside diameter of the first idler wheel is greater than the outside diameter of the first idler wheel per meter of idler wheel width, and the inside diameter of the second idler wheel is greater than the outside diameter of the second idler wheel per meter of idler wheel width. In some aspects, the first and the second idler wheels are connected to one another and move together, while in other aspects the first and the second idler move independently.

In some embodiments, the at least one idler wheel has an outer surface extending between the inside diameter and the outside diameter. The outer surface may have a substantially flat profile shape, a substantially convex profile shape, or even a substantially concave profile shape.

In some aspects, embodiments specifically disclose a plurality of idler wheels which are idler wheel sets for use in a tracked vehicle having a track which is comprised of an elastomeric material having a first surface displaying a series of ground engaging profiles longitudinally spaced along said surface and a second surface displaying a series of wheel engaging drive lugs spaced longitudinally along said surface, said idler wheel set comprised of a first idler wheel and a second idler wheel, wherein the first idler wheel is essentially parallel to a second idler wheel, wherein the first idler wheel and the second idler wheel are separated by a distance of greater than the width of the drive lugs, and wherein the inside diameter of the first idler wheel is 5 mm to 35 mm greater than the outside diameter of the first idler wheel per meter of idler wheel width, wherein the inside diameter of the second idler wheel is 5 mm to 35 mm greater than the outside diameter of the second idler wheel per meter of idler wheel width.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and wherein.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
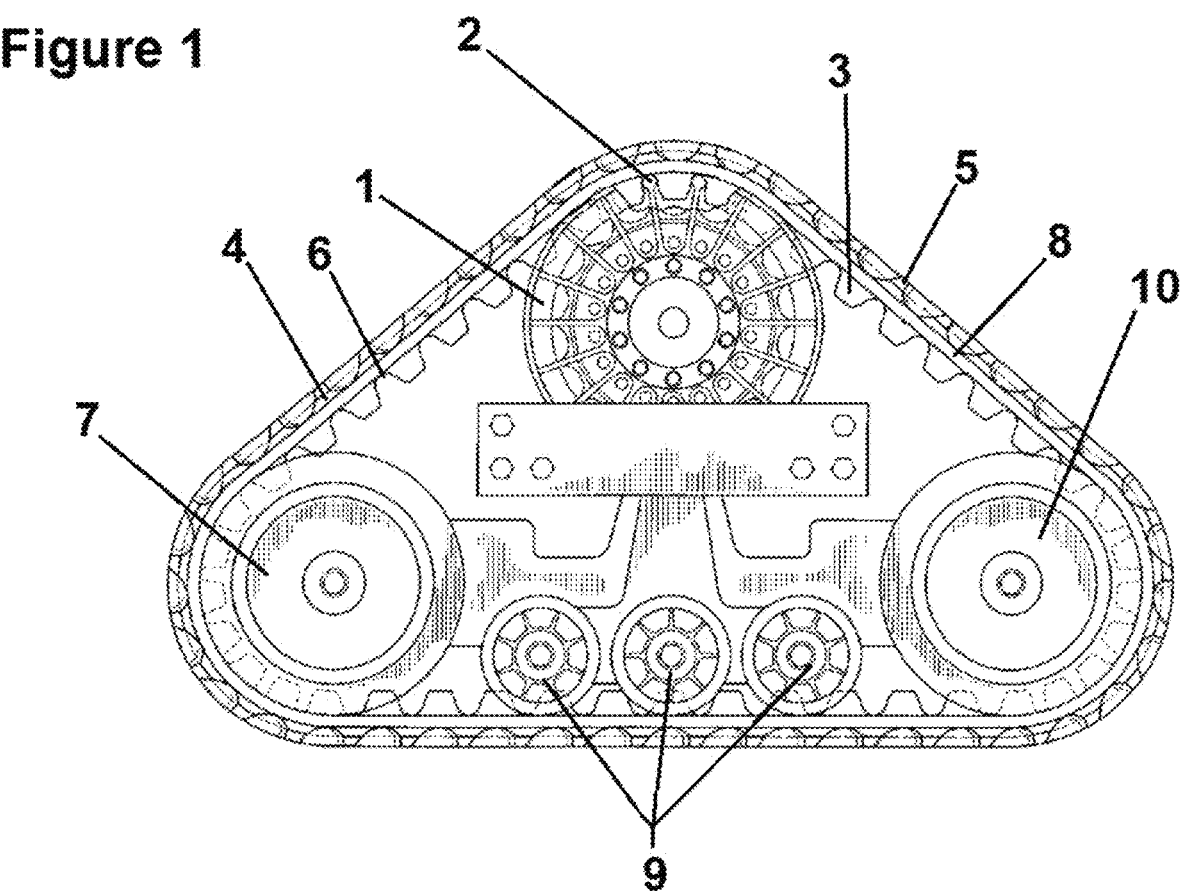
FIG. 1 illustrates a vehicle track system in a side view.

Now referencing FIG. 1, which shows a vehicle track assembly having a drive wheel 1 comprised of a plurality of teeth or drive bars 2 which are positioned for engagement with the drive lugs 3. The drive lugs 3 are integrated in a track 8 having an endless carcass, thus forming an endless track with drive lugs. In some aspects, the endless track is formed of an elastomeric material. Such an elastomeric track of a tracked vehicle can be made of natural or synthetic rubber, such as emulsion styrene-butadiene rubber, solution styrene-butadiene rubber, synthetic polyisoprene rubber, polybutadiene rubber, a blend or natural and synthetic rubbers, or any other suitable material. The track is typically reinforced with fabric and/or steel reinforcing elements, as known to those of skill in the art. The outer surface 4 of the track 8 includes a plurality of ground engaging profiles 5, and the inner surface 6 of the track 8 includes a plurality of drive lugs 3. FIG. 1 further shows two sets of idler wheels 7, 10 each located on opposite ends of the vehicle track, and roller wheels 9 located between the idler wheels and at the bottom of the vehicle. The wheel arrangement of FIG. 1 is commonly found on bulldozers, and heavy duty machinery designed to operate in the snow, mud, sand or other like materials. Other tracked vehicles are designed with only one set of idler wheels, roller wheels, and one drive wheel. Idler wheels 7, 10 generally include hubs, flanges, and rims as part of their axle assembly.

Figure 2:
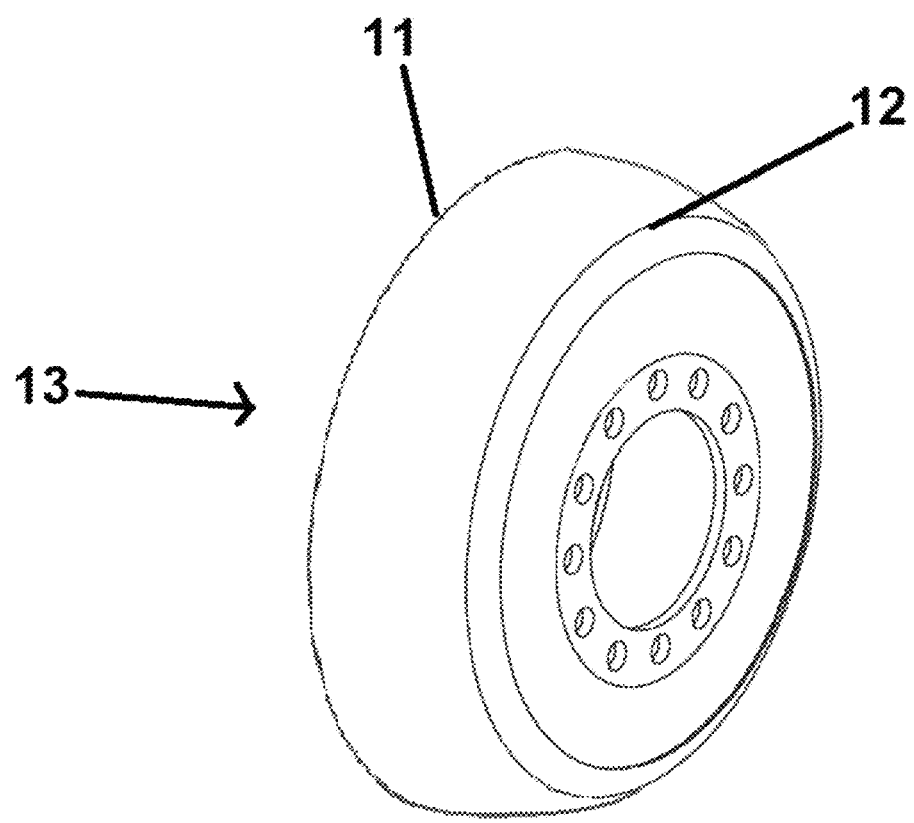
FIG. 2 depicts one embodiment of an idler wheel in a perspective view, according to the disclosure; and, FIG. 3 is an aerial view of one embodiment of an idler wheel, according to the disclosure.
Figure 3:
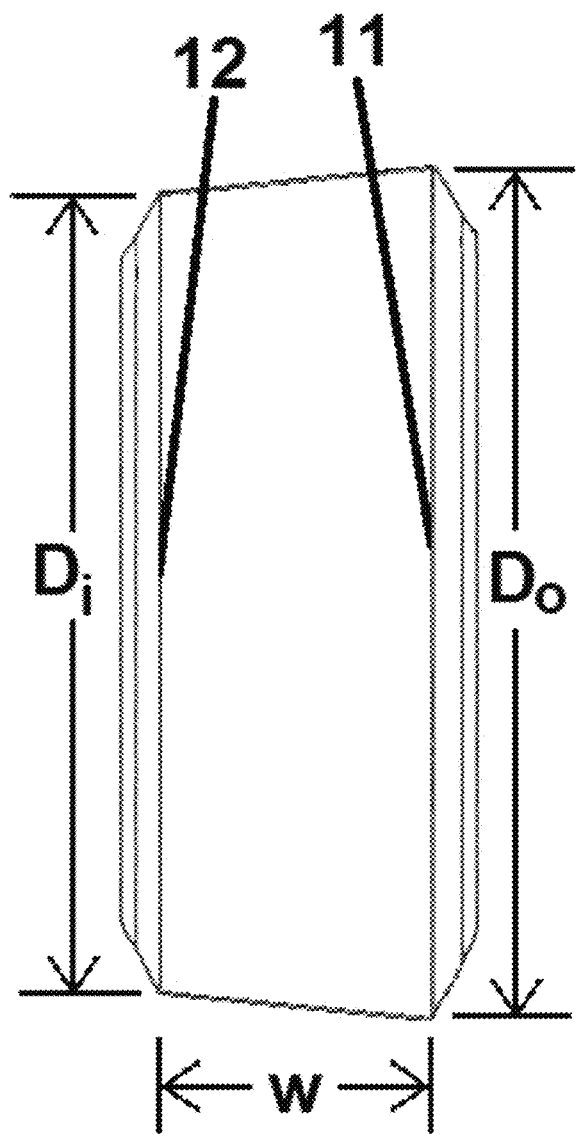
Figure 4:
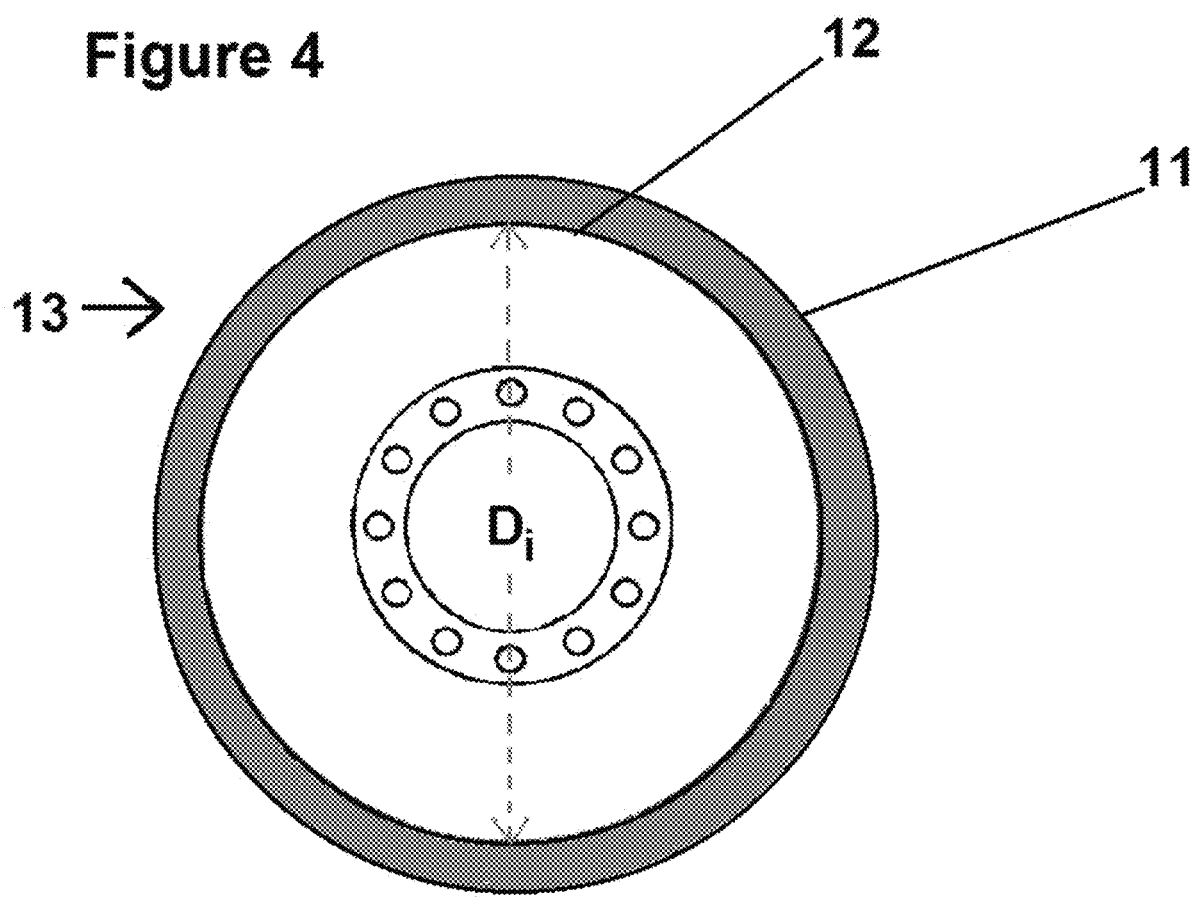
FIG. 4 is a side view of the one embodiment of an idler wheel.

Both FIGS. 2 and 3 depict an idler wheel 13 having an inside diameter 11 which is greater than the outside diameter 12. For illustration purposes, the difference in sizes between the inside diameter 11 and the outside diameter 12 may be exaggerated in these Figures. Generally the idler wheel 13 has an inside diameter 11 which is about 5 mm to about 35 mm greater than the outside diameter 12 of the idler wheel per meter of wheel width. Idler wheel width is usually between 10 mm to about 25 mm.

As depicted FIGS. 2 and 3, the idler wheel has an outer surface extending between the inside diameter Di/11 and the outside diameter Do/12. The outer surface may have a substantially flat profile shape as shown, or a substantially convex profile shape, or even a substantially concave profile shape.

The inside diameter 11 of the idler wheel 13 faces towards the drive lugs 3, and the outside diameter 12 of the idler wheel 13 faces away from the drive lugs 3. In some cases, idler wheel sets usually have a first idler wheel parallel to a second wheel and separated by a distance of greater than the width of the drive lugs. The first and second idler wheels may be connected to one another and move together, or they can move independently. Idler wheels 13 can be made of iron, stainless steel, a high quality carbon steel, or any other suitable material. Idler wheels 13 can include internal reinforcements to protect the wheel shape, and some manufactures heat treat the idler wheels 13 to extend their service life.

FIG. 3 is an aerial view of the idler wheel of FIG. 2. Typically an idler wheel 13 according to some aspects of the disclosure, has an inside diameter 11 which is about 10 mm to about 30 mm greater than the outside diameter 12 of the idler wheel per meter of wheel width. In some cases, the idler wheels according to the disclosure may have an inside diameter 11 which is about 15 mm to about 25 mm greater than the outside diameter 12 of the idler wheel per meter of wheel width.

When the vehicle track is in motion, the drive lugs 3 are engaged, powered and driven by the drive wheel 1 and the vehicle track 8 rolls over one or more idler wheels 13. The track 8 is unable to misalign because the idler wheels 13 according to the disclosure are adapted for use in a tracked vehicle. More specifically, the elastomeric track 8 is held in position because the inside diameter 11 of each idler wheel 13 is larger than the outside diameter 12 of each idler wheel 13, placing tension on the track 8 when the track 8 contacts the inside diameter 11 of each idler wheel 13. The elastomeric track 8 experiences maximum tension from each idler wheel 13 when the track 8 is at the highest point of the idler wheel 13. The track tension resulting from this idler wheel design prevents track misalignment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A vehicle track assembly to facilitate track alignment comprising:
    an endless track having a first surface displaying a series of ground engaging profiles longitudinally spaced along the first surface and a second surface displaying a series of wheel engaging drive lugs spaced longitudinally along the second surface;
    a drive wheel for engaging the drive lugs; and,
    at least one idler wheel defining an inside diameter and an outside diameter, wherein the inside diameter of the at least first idler wheel is greater than the outside diameter of the at least one idler wheel, wherein the inside diameter faces toward the drive lugs and the outside diameter faces away from the drive lugs.

2. The vehicle track assembly of claim 1, wherein the at least one idler wheel is a plurality of idler wheels.

3. The vehicle track assembly of claim 2, wherein the a plurality of idler wheels is an idler wheel set comprised of a first idler wheel and a second idler wheel, wherein the inside diameter of the first idler wheel is greater than the outside diameter of the first idler wheel per meter of idler wheel width, and wherein the inside diameter of the second idler wheel is greater than the outside diameter of the second idler wheel per meter of idler wheel width.

4. The vehicle track assembly of claim 3, wherein the inside diameter of the first idler wheel is 5 mm to 35 mm greater than the outside diameter of the first idler wheel per meter of idler wheel width, wherein the inside diameter of the second idler wheel is 5 mm to 35 mm greater than the outside diameter of the second idler wheel per meter of idler wheel width.

5. The vehicle track assembly of claim 4, wherein the inside diameter of the first idler wheel is 10 mm to 30 mm greater than the outside diameter of the first idler wheel per meter of idler wheel width, wherein the inside diameter of the second idler wheel is 10 mm to 30 mm greater than the outside diameter of the second idler wheel per meter of idler wheel width.

6. The vehicle track assembly of claim 5, wherein the inside diameter of the first idler wheel is 15 mm to 25 mm greater than the outside diameter of the first idler wheel per meter of idler wheel width, wherein the inside diameter of the second idler wheel is 15 mm to 25 mm greater than the outside diameter of the second idler wheel per meter of idler wheel width.

7. The vehicle track assembly of claim 1, wherein the endless track comprises an elastomeric material.

8. The vehicle track assembly of any of claim 1, wherein the inside diameter of the at least one idler wheel faces towards the drive lugs, and wherein the outside diameter of at least one idler wheel faces away from the drive lugs.

9. The vehicle track assembly of claim 1, wherein the at least one idler wheel comprises an outer surface extending between the inside diameter and the outside diameter and has a substantially convex profile shape.

10. The vehicle track assembly of claim 1, wherein the at least one idler wheel is configured to carry the endless track from the ground toward a drive wheel.

11. A vehicle track assembly comprising:
an endless track having a first surface displaying a series of ground engaging profiles longitudinally spaced along the first surface and a second surface displaying a series of wheel engaging drive lugs spaced longitudinally along the second surface;
a drive wheel for engaging the drive lugs;
at least one idler wheel defining an inside diameter and an outside diameter, wherein the inside diameter of the at least one idler wheel is greater than the outside diameter of the at least one idler wheel, wherein the inside diameter faces toward the drive lugs and the outside diameter faces away from the drive lugs; and,
wherein the at least one idler wheel comprises an outer surface extending between the inside diameter and the outside diameter.

12. The vehicle track assembly of claim 11, wherein the outer surface has a substantially flat profile shape.

13. The vehicle track assembly of claim 11, wherein the outer surface has a substantially convex profile shape.

14. The vehicle track assembly of claim 11, wherein the outer surface has a substantially concave profile shape.

15. The vehicle track assembly of claim 11, wherein the at least one idler wheel is a plurality of idler wheels.

16. The vehicle track assembly of claim 15, wherein the a plurality of idler wheels is an idler wheel set comprised of a first idler wheel and a second idler wheel, wherein the inside diameter of the first idler wheel is greater than the outside diameter of the first idler wheel per meter of idler wheel width, and wherein the inside diameter of the second idler wheel is greater than the outside diameter of the second idler wheel per meter of idler wheel width.

17. The vehicle track assembly of claim 16, wherein the inside diameter of the first idler wheel is 5 mm to 35 mm greater than the outside diameter of the first idler wheel per meter of idler wheel width, wherein the inside diameter of the second idler wheel is 5 mm to 35 mm greater than the outside diameter of the second idler wheel per meter of idler wheel width.

18. The vehicle track assembly of claim 17, wherein the inside diameter of the first idler wheel is 10 mm to 30 mm greater than the outside diameter of the first idler wheel per meter of idler wheel width, wherein the inside diameter of the second idler wheel is 10 mm to 30 mm greater than the outside diameter of the second idler wheel per meter of idler wheel width.

19. The vehicle track assembly of claim 18, wherein the inside diameter of the first idler wheel is 15 mm to 25 mm greater than the outside diameter of the first idler wheel per meter of idler wheel width, wherein the inside diameter of the second idler wheel is 15 mm to 25 mm greater than the outside diameter of the second idler wheel per meter of idler wheel width.

20. The vehicle track assembly of claim 11, wherein the endless track comprises an elastomeric material.

21. A vehicle track assembly comprising:
an endless track having a first surface displaying a series of ground engaging profiles longitudinally spaced along the first surface and a second surface displaying a series of wheel engaging drive lugs spaced longitudinally along the second surface;
a drive wheel for engaging the drive lugs; and,
at least one idler wheel defining an inside diameter and an outside diameter, wherein the inside diameter of the at least one first idler wheel is greater than the outside diameter of the first idler wheel per meter of idler wheel width, and the inside diameter faces toward the series of wheel engaging drive lugs and the outside diameter faces away from the series of wheel engaging drive lugs,
wherein the at least one idler wheel is an idler wheel set having a first idler wheel disposed essentially parallel to a second idler wheel, and wherein the first idler wheel and the second idler wheel are separated by a distance of greater than the width of the drive lugs.

22. The vehicle track assembly of claim 21, wherein the first and the second idler wheels are connected to one another and move together.

23. The vehicle track assembly of claim 21, wherein the first and the second idler move independently.

* * * * *